United States Patent [19]

Meier et al.

[11] Patent Number: 5,771,563
[45] Date of Patent: Jun. 30, 1998

[54] METHOD AND DEVICE FOR PRODUCING CONDUCTOR BARS FOR DYNAMOELECTRIC MACHINES

[75] Inventors: Walter Meier, Waltenschwil, Switzerland; Günter Müller, Weiz, Austria

[73] Assignee: Asea Brown Boveri AG, Baden, Switzerland

[21] Appl. No.: 589,088

[22] Filed: Jan. 23, 1996

[30] Foreign Application Priority Data

Feb. 15, 1995 [DE] Germany ................ 195 05 020.7

[51] Int. Cl.[6] .................................................. H02K 15/14
[52] U.S. Cl. .................... 29/596; 29/597; 29/402.16; 29/446; 310/214
[58] Field of Search .................................. 29/592.1, 596, 29/597, 446, 402.08, 402.16; 310/214, 60 A, 54; 228/165, 170

[56] References Cited

U.S. PATENT DOCUMENTS

| | | |
|---|---|---|
| 3,704,870 | 12/1972 | Kremser. |
| 5,557,837 | 9/1996 | Thiard-Laforet et al. ............... 29/596 |
| 5,659,944 | 8/1997 | Thiard-Laforet et al. ............... 29/596 |

FOREIGN PATENT DOCUMENTS

| | | |
|---|---|---|
| 0059402 | 9/1982 | European Pat. Off.. |
| 1613441 | 5/1972 | Germany. |
| 1926356 | 10/1975 | Germany. |

OTHER PUBLICATIONS

Herstellung der Wicklungen elektrischer Maschinen; H. Sequenz et al.; Springer–Verlag; Wien, New York, 1973, pp. 150–153.

*Primary Examiner*—W. Donald Bray
*Attorney, Agent, or Firm*—Oblon, Spivak, McClelland, Maier & Neustadt, P.C.

[57] ABSTRACT

In the method for producing conductor bars for dynamoelectric machines, the conductor bars are inserted, with a main insulation (4), applied when dry, into a pressing device with the interposition of a separating film, are pressed to size in said pressing device and, together with the pressing device, are impregnated with impregnating resin in an impregnating vessel and cured.

In order to increase the dimensional accuracy of the conductor bars and to simplify the production method, the dry-insulated conductor bars are inserted (10, 11) individually into a pressing device which is adapted to the bar shape and surrounds the conductor bar over its entire length and circumference and are pressed to the final dimension in said pressing device. Subsequently, a plurality of conductor bars thus prepared are inserted together with the associated pressing device into the impregnating vessel and impregnated there with impregnating resin.

11 Claims, 5 Drawing Sheets

METHOD AND DEVICE FOR PRODUCING CONDUCTOR BARS FOR DYNAMOELECTRIC MACHINES

BACKGROUND OF THE INVENTION

Field of the Invention

The invention relates to a method for producing conductor bars for dynamoelectric machines, in which the conductor bars are arranged with a main insulation, applied when dry, in a pressing device with the interposition of a separating film, are pressed to size in said pressing device and, together with the pressing device, are impregnated with impregnating resin in an impregnating vessel and cured.

The invention further relates to a device for carrying out the method.

In this regard, the invention refers to a prior art such as is described, for example, in the book by Sequenz "Herstellung der Wicklungen elektrischer Maschinen" ["Producing the windings of electric machines"], Springer-Verlag, Vienna, N.Y., 1973, in particular page 153.

Discussion of Background

The winding insulation of bar windings is mostly performed by means of vacuum impregnation using curable, solvent-free impregnating resins. This technique permits the use of mica tapes which can initially be wound onto the bars in a virtually dry form with a low proportion of binder. It is in the first instance the impregnation and the impregnating resin which serve to determine the final quality of the insulation. Moreover, they contribute to the additional setting of conductors and component conductors, because all the remaining cavities are filled up with impregnating resin.

Two different methods of impregnation and shaping have been developed in this technique.

In the first (older) method, after predrying in the furnace the conductor bars, insulated when dry, are put into a vacuum installation and degassed for the impregnation. After the desired vacuum has been reached, the material to be impregnated, which is located in an impregnating container, is immersed in the impregnating resin, which is preheated and degassed if appropriate. This is followed by a sufficiently long pressure period which promotes the penetration of the resin into the mica taping.

After the removal of the bars from the impregnating trough, separating films, which are intended to prevent bonding to the mold during curing, are applied to the taping, which is now impregnated and therefore mechanically sensitive. Since surplus impregnating resin has to be pressed out of the taping again during shaping, high squeezing pressures are required to close the molds and to bring the conductor insulation to the envisaged dimension. The impregnated insulation of the bars is cured in heatable molds or presses directly or together with these in a furnace at temperatures of between 120° and 150° C. over several hours.

The transfer of the bars with the impregnated taping from the impregnating trough into the shaping presses is avoided by a recent method in which the bars with the dry insulation are inserted into a mold in which they remain during impregnation and curing. Since the shaping of the dry mica taping requires a lesser force, such molds can be less heavy in design. In addition, they permit the simultaneous impregnation of a relatively large number of bars if they are stacked in a suitable way close together by utilizing the volume present. The required parting compounds and separating films are already applied before installation, and cleaning of the mold is greatly facilitated owing to its easy dismountability and the use of adaptors and strips which can be mounted in modular fashion (compare loc.cit. FIG. 92 on page 153).

The conductor bars produced according to the first-named method have a high geometrical accuracy, but are expensive to produce. In particular, the stress on the environment is very high. The second method is substantially more economic, but the joint pressing and curing of such a large number of bars requires expensive preparatory work in order to ensure, inter alia, that the required bar geometry can be observed.

SUMMARY OF THE INVENTION

Accordingly, one object of the invention is to provide a novel method and associated device for producing conductor bars for dynamoelectric machines, which produces close-tolerance conductor bars at comparatively low cost, and which is distinguished by a low stress on the environment, in particular for the operating staff.

The first part of the object is achieved according to the invention when the dry-insulated conductor bars are inserted individually into a pressing device which is adapted to the bar shape and surrounds the bar over its entire length and circumference and are pressed to the final dimension in said pressing device, and when subsequently a plurality of conductor bars thus prepared are inserted together with the associated pressing device into the impregnating vessel and impregnated there with impregnating resin.

The device for carrying out the method is typified by a pressing device which comprises pressing strips which surround the dry-insulated conductor bar and are joined, preferably welded, to one another at points along their longitudinal edges. It is advantageous in this case to use pressing strips having an L-profile, which embrace the conductor bar with their two legs respectively on two abutting lateral surfaces. The latter are then welded to one another at points at the joints. This design of the pressing device increases the dimensional accuracy of the pressing device.

In principle, the evolute part (face clip) of the conductor bars could also be "armored" in this way. For reasons of simplicity of production, however, the pressing strips are of flat material there, because the dimensional accuracy rather plays a subordinate role in the region of the winding overhang.

The method according to the invention brings together the advantages of the known methods outlined at the beginning, without having their shortcomings. The advantages are to be seen, in particular, in that in addition to a lower stress on the environment the bar geometry and the bar dimensions are accurately observed. After closure of the pressing device, the sensitive main insulation is protected, because the pressing device acts as a type of armor. This armor requires little space, with the result that for a given volume of the impregnating vessel it is possible for more conductor bars to be simultaneously impregnated and cured. Again, cleaning of the pressing device is comparatively simple, because there are no complicated parts.

The pressing device is of particularly simple configuration, because it is assembled from parts which are easy to produce and, in addition, easy to clean.

Exemplary embodiments of the invention and the advantages achievable thereby are explained in more detail below with the aid of the drawing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
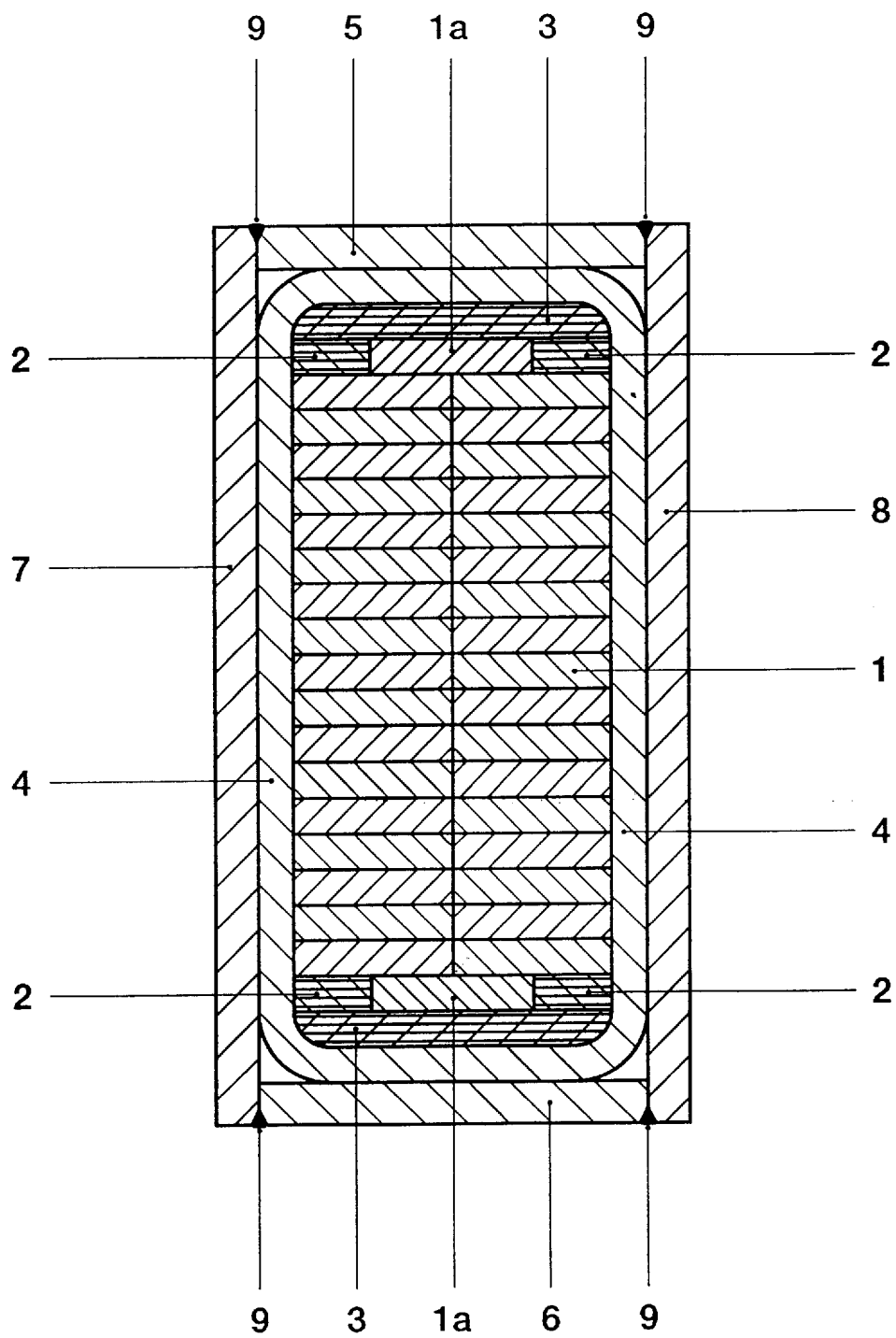
FIG. 1 shows a cross section through a conductor bar with a pressing device which surrounds it and consists of four flat pressing strips which are welded at points along the joining edges.

Referring now to the drawings, wherein like reference numerals designate identical or corresponding parts throughout the several views, in the cross section, represented in FIGS. 1 to 4, through a conductor bar assembled from insulated flat copper conductors 1, the component conductors are stranded with one another in accordance with the Roebel principle. In this technique, which has now been applied for many decades, for avoiding loop currents, each component conductor changes its radial height over the bar length. This, in turn, means that cavities, which are filled up in the example with a semiconducting pasty filler 2, occur at the so-called crossover points on the narrow sides of the conductor bar. Alternatively, a filler strip having the width of a conductor bundle can also be placed on the narrow sides of the bar, which is adapted to the molds present during the later pressing. A covering strip 3 made from carbon fiber reinforced plastic (CFRP) covers this filler and the outermost component conductor 1a. This covering strip 3 is rounded off at its outwardly pointing edges (represented exaggeratedly in FIGS. 1 to 4), with a rounding radius of typically 1.5 to 2 mm. In this way, the field strength in this region is reduced. Moreover, upon being applied there, the main insulation 4 surrounding the conductor bundle suffers less damage, with the result that it can be designed to be thinner a priori.

The conductor bar assembled in this way is now inserted into, or surrounded by, a pressing device together with the main insulation 4, applied when dry, and with the interposition of separating films (not illustrated) known per se. In a first embodiment, this pressing device comprises four pressing strips 5 to 8 which completely surround the conductor bar in the circumferential direction and over its entire length. The width of the pressing strips 5, 6 assigned to the narrow sides of the bar is dimensioned such that said strips correspond to the desired conductor bar width. The width of the pressing strips 7, 8 assigned to the broad sides of the conductor bar corresponds to the desired conductor bar height plus double the thickness of the pressing strips 5, 6.

This configuration of the pressing device permits pressing of the (dry-insulated) conductor bar to the desired dimension, because the two narrow pressing strips 5, 6 determine the spacing between the broad pressing strips 7, 8, and thus the conductor bar width. Pressing to dimension at the conductor bar height can also be monitored in a simple way: when both pressing strips 5, 6 are flush with the edges of the pressing strips 7, 8, the conductor bar height is also at the desired dimension.

Figure 5:
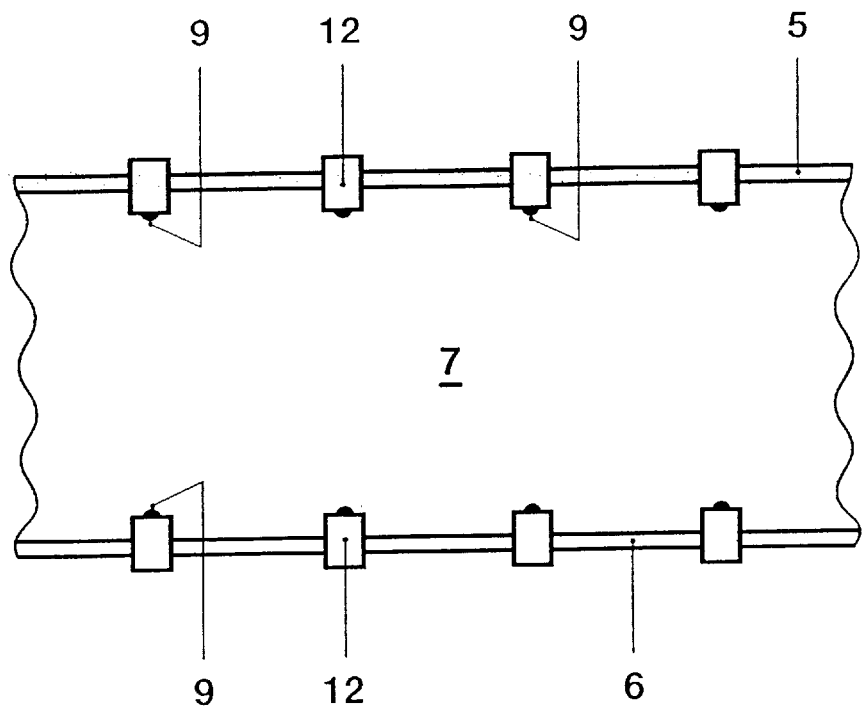
FIG. 5 shows a side view of the slot section of a conductor bar provided with the pressing device in accordance with FIG. 3.
Figure 6:
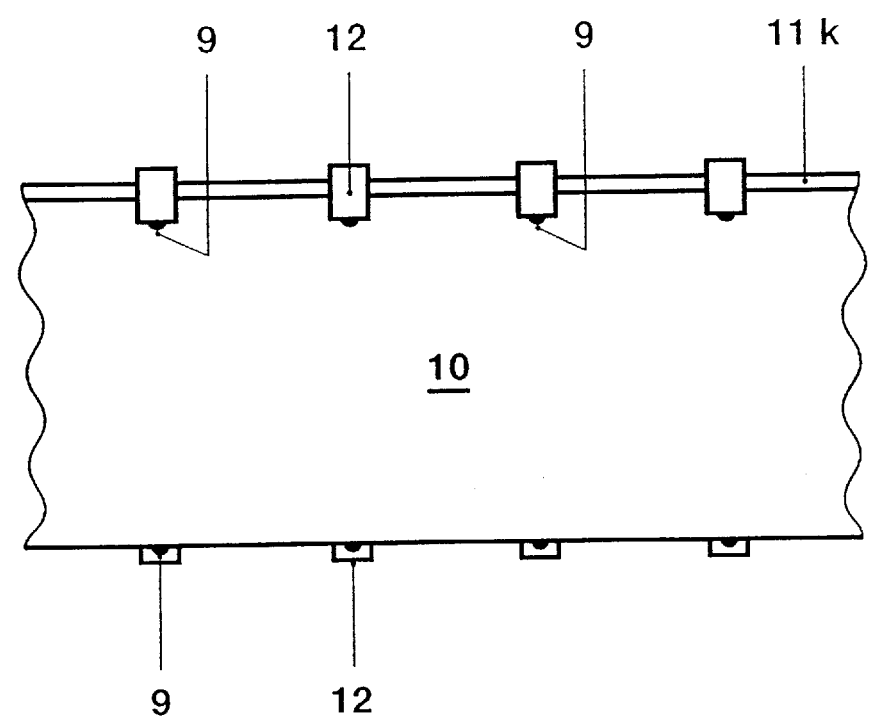
FIG. 6 shows a side view of the slot section of a conductor bar provided with the pressing device in accordance with FIG. 4.

Pressing itself can be performed using arbitrary auxiliary devices. These can act, in principle, over the entire bar length. However, it is preferable for the pressing to be performed with the aid of clamping means of screw-clamp type which are applied in a fashion distributed uniformly and at a comparatively small spacing over the bar length. As emerges from FIGS. 5 and 6, sufficient space is available for applying the clamping means between neighboring joining points. The clamping means can be operated in this case manually, pneumatically or hydraulically. After pressing to the desired dimension, the pressing strips 5 to 8 are now welded at points at their joints. These weld junctions are denoted by 9 in the drawing. In this case, it is preferable for the weld junctions respectively to come to be situated between two neighboring clamping points.

Because the face clip section of a conductor bar has a comparatively complex shape, mostly an evolute shape, it is expedient to subdivide the pressing strips in the longitudinal direction of the bar, it being possible to provide a continuous pressing strip for the slot section of the conductor bar, and one or more pressing strips for the clip part.

Figure 2:
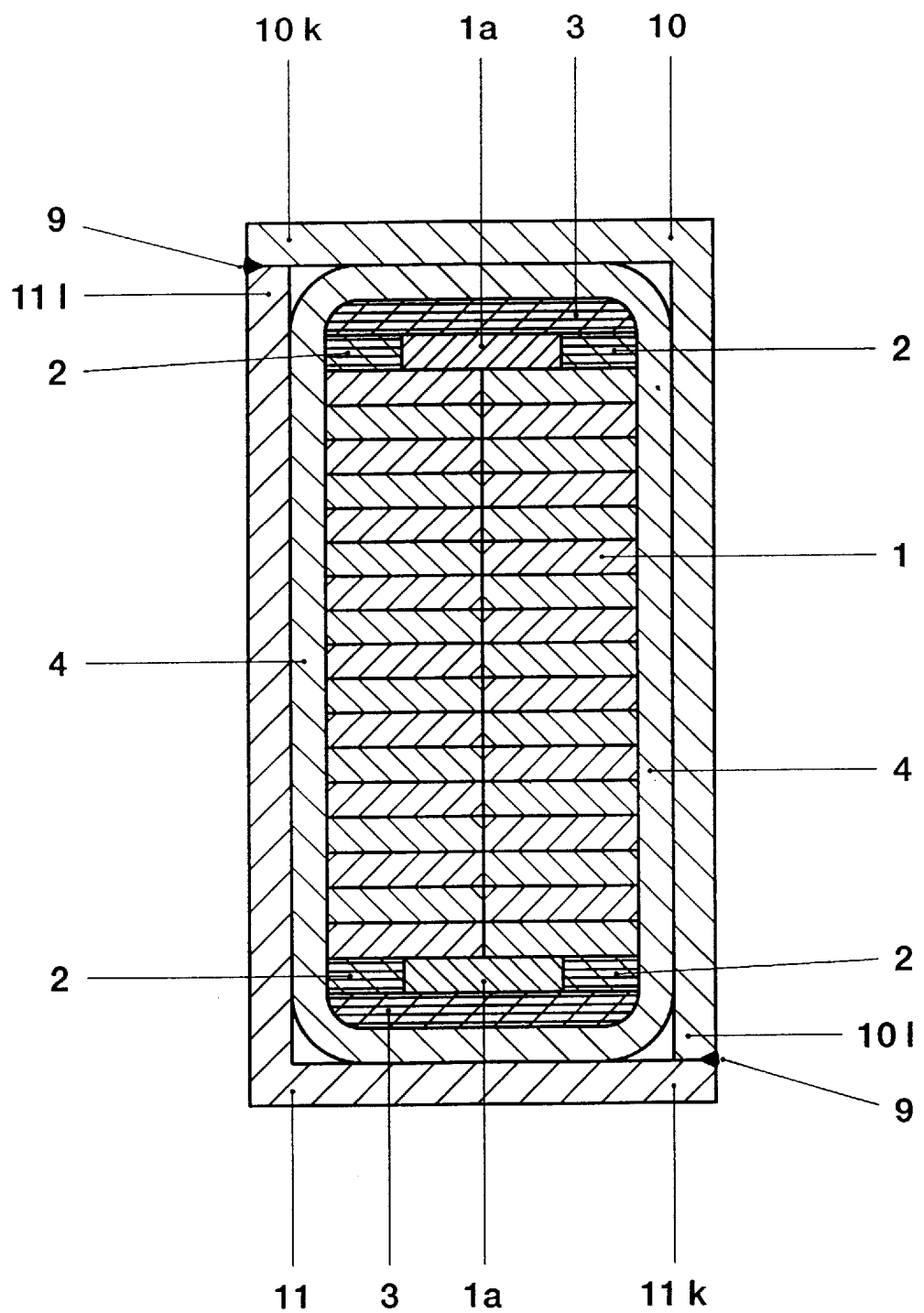
FIG. 2 shows a cross section through a conductor bar with a pressing device which surrounds it and consists of two L-shaped pressing strips which are welded at points along the joining edges.

This procedure becomes almost mandatory when—as represented in FIG. 2—pressing strips 10, 11 having an L-shaped cross section are used. In this case, the end faces of the short limb ends 10k, 11k respectively obtusely abut the long limb ends 101 and 111, where they are welded at points in a fashion analogous to FIG. 1. This embodiment also returns a high dimensional accuracy during pressing, because here, as well, the height and width of the conductor bar are determined by the geometry of the pressing strips and are easy to monitor during the pressing operation.

Figure 3:
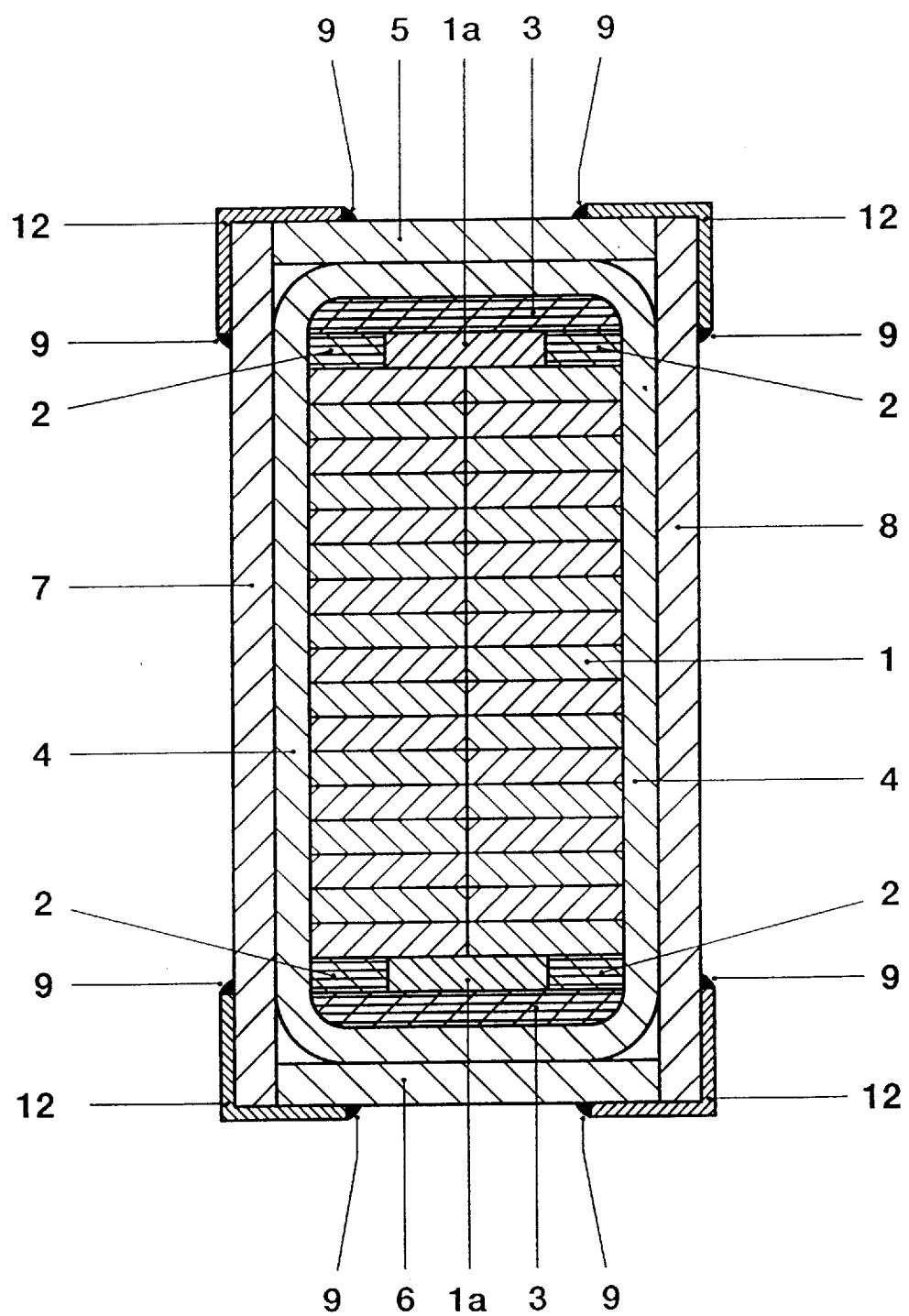
FIG. 3 shows a cross section through a conductor bar with a pressing device which surrounds it and consists of four flat pressing strips which are joined to one another at points by means of angular links.
Figure 4:
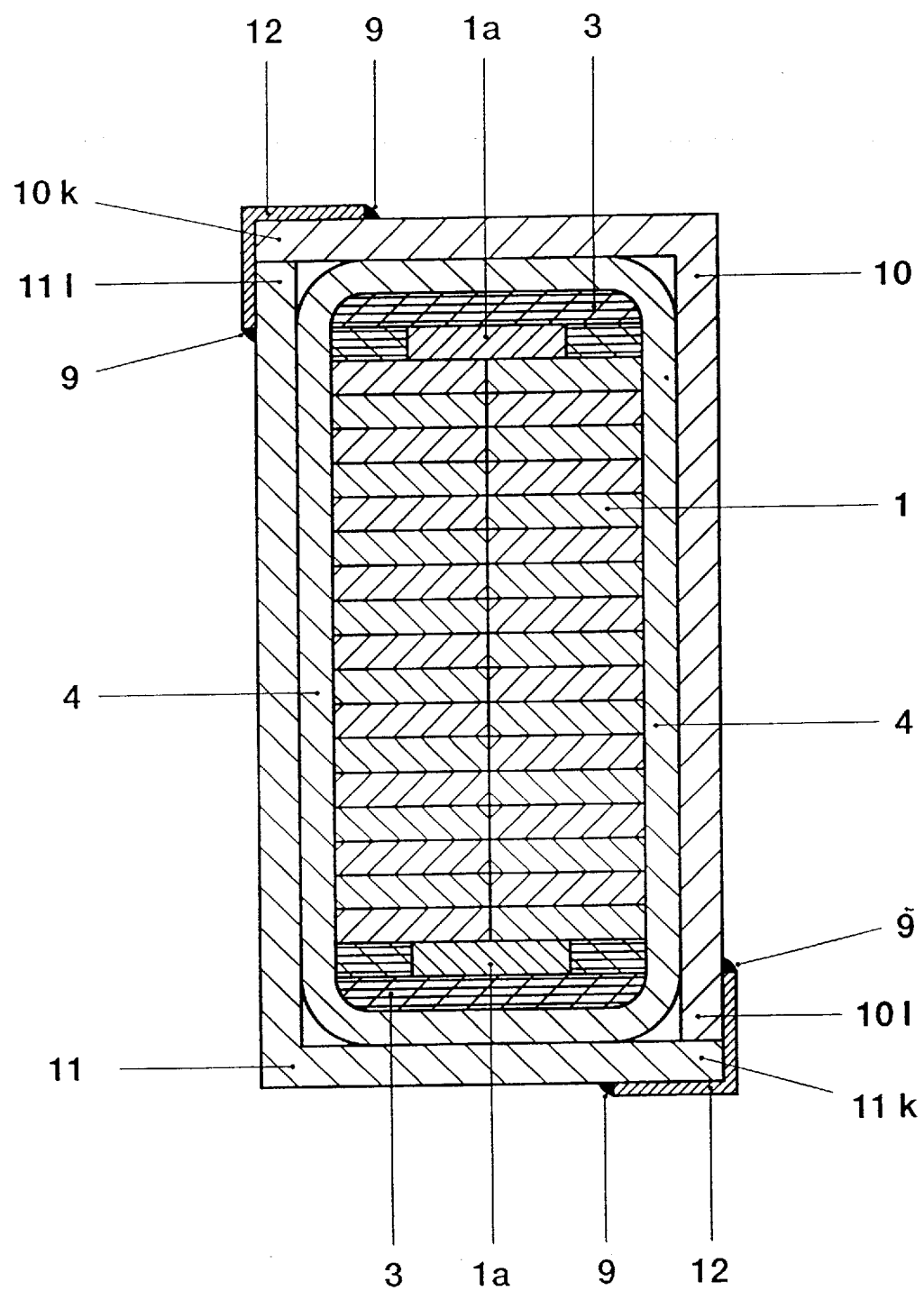
FIG. 4 shows a cross section through a conductor bar with a pressing device which surrounds it and consists of two L-shaped pressing strips which are joined to one another by means of angular links.

Instead of the flat pressing strips 5 to 8 and the pressing strips 10, 11 having an L-shaped cross section being "directly" joined to one another at points, a particularly advantageous embodiment of the invention provides for the pressing strips 5 to 8 and 10 and 11 to be joined to one another at points by means of angular links 12. This is illustrated in FIG. 3 for a pressing device consisting of four flat pressing strips having an L-shaped cross section, and in FIG. 4 for a pressing device consisting of two pressing strips having an L-shaped cross section. The welding is performed in this case at the link ends, which facilitates the removal of the links. The use of such links 12 greatly simplifies welding, because the risk of burning through and thereby of damaging the main insulation is eliminated. In addition, the links 12 can be removed again in a substantially simpler way (after impregnation and curing of the insulation). The preparation of the pressing strips for renewed use is also simpler, because there is no need to rework the joints. The extra outlay caused by the provision of the links 12 is more than made good by these advantages.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A method for producing conductor bars for dynamo-electric machines, in which the conductor bars are arranged with a main insulation applied when dry, in a pressing device with the interposition of a separating film, are pressed to size in said pressing device and, together with the pressing device, are impregnated with impregnating resin in an impregnating vessel and cured, the method comprising the steps of:

inserting the dry insulated conductor bars into a pressing device, wherein said pressing device is adapted to the conductor bar shape and surrounds the conductor bar over its entire length and circumference;

pressing the conductor bar and insulation into the final dimension in said pressing device; and impregnating the conductor bars by inserting the bars and the pressing device into the impregnating vessel which is filled with impregnating resin.

2. The method as claimed in claim 1, wherein the pressing device comprises a plurality of pressing strips, said pressing strips divided in the circumferential direction of the bar, said pressing strips closed along the longitudinal edges of the bar, wherein said pressing device is not reopened until after impregnation and curing.

3. The method as claimed in claim 2, wherein said pressing strips are welded to one another.

4. The method as claimed in claim 2, wherein said pressing strips are welded to one another with angular links.

5. A device for carrying out the method as claimed in claim 1, comprising:

pressing strips, wherein said pressing strips surround the dry insulated conductor bar, said pressing strips are welded to one another at points along their longitudinal edge.

6. The device as claimed in claim 5, wherein said pressing strips have an L-profile, and each embrace the conductors bar with their two legs respectively on two abutting lateral surfaces of said conductor bars, said strips are joined to one another at their ends.

7. The device as claimed in claim 5, wherein said pressing strips are joined by at least two angular links which are respectively welded to the pressing strips at their free ends.

8. The device as claimed in claim 5, wherein said pressing strips are subdivided in the longitudinal direction of the bar, at least the parts of the pressing strips assigned to the face clip part of the conductor bar being separated from the slot section.

9. The device as claimed in claim 6, wherein said pressing strips are joined by at least two angular links which are respectively welded to the pressing strips at their free ends.

10. The device as claimed in claim 6, wherein said pressing strips are subdivided in the longitudinal direction of the bar, at least the parts of the pressing strips assigned to the face clip part of the conductor bar being separated from the slot section.

11. The device as claimed in claim 7, wherein said pressing strips are subdivided in the longitudinal direction of the bar, at least the parts of the pressing strips assigned to the face clip part of the conductor bar being separated from the slot section.

\* \* \* \* \*